(12) United States Patent
Alameh et al.

(10) Patent No.: US 10,630,866 B2
(45) Date of Patent: Apr. 21, 2020

(54) ELECTRONIC DEVICES AND METHODS FOR BLURRING AND REVEALING PERSONS APPEARING IN IMAGES

(71) Applicant: Motorola Mobility LLC, Chicago, IL (US)

(72) Inventors: Rachid Alameh, Crystal Lake, IL (US); Amitkumar Balar, Mundelein, IL (US); James Wylder, Chicago, IL (US); Jarrett Simerson, Glenview, IL (US); Thomas Merrell, Beach Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 90 days.

(21) Appl. No.: 15/881,793

(22) Filed: Jan. 28, 2018

(65) Prior Publication Data
US 2019/0238719 A1 Aug. 1, 2019

(51) Int. Cl.
*H04N 1/44* (2006.01)
*H04W 12/02* (2009.01)
*H04W 12/08* (2009.01)
*G06F 21/62* (2013.01)
*G06K 9/00* (2006.01)
*H04N 1/00* (2006.01)
*H04N 5/262* (2006.01)

(52) U.S. Cl.
CPC ......... *H04N 1/448* (2013.01); *G06F 21/6254* (2013.01); *G06K 9/00288* (2013.01); *H04N 1/00209* (2013.01); *H04N 1/444* (2013.01); *H04N 5/2621* (2013.01); *H04W 12/02* (2013.01); *H04W 12/08* (2013.01); *H04N 2201/0084* (2013.01)

(58) Field of Classification Search
CPC .... H04N 1/448; H04N 1/00209; H04N 1/444; H04N 5/2621; G06K 9/00288
See application file for complete search history.

(56) References Cited

U.S. PATENT DOCUMENTS

| 8,340,974 | B2 | 12/2012 | Zurek et al. |
| 8,589,968 | B2 | 11/2013 | Alberth et al. |
| 8,593,452 | B2 | 11/2013 | Solem et al. |
| 9,384,386 | B2 | 7/2016 | Lee et al. |

(Continued)

FOREIGN PATENT DOCUMENTS

| AU | 2015297230 | 2/2017 |
| WO | 2014/143534 | 9/2014 |

(Continued)

OTHER PUBLICATIONS

EXIF Tags—Description and Tools; Published on https://www.sno.phy.queensu.ca/~phil/exiftool/TagNames/EXIF.html; Unknown Publication Date but last revised Feb. 13, 2018.

(Continued)

*Primary Examiner* — Sinh Tran
*Assistant Examiner* — Zhenzhen Wu
(74) *Attorney, Agent, or Firm* — Philip H. Burrus, IV

(57) ABSTRACT

An electronic device includes an imager and one or more processors operable with the imager. The imager captures at least one image of a plurality of persons. The one or more processors blur depictions of one or more persons of the plurality of persons until a reveal permission instruction is detected.

20 Claims, 8 Drawing Sheets

(56) References Cited

U.S. PATENT DOCUMENTS

| | | | |
|---|---|---|---|
| 9,396,354 B1 | 7/2016 | Murphy | |
| 9,471,838 B2 | 10/2016 | Miller et al. | |
| 9,521,135 B2* | 12/2016 | Sultani | H04L 63/08 |
| 10,146,925 B1* | 12/2018 | Rosenberg | G06K 9/00677 |
| 2009/0220093 A1* | 9/2009 | Hodges | H04N 1/00132 |
| | | | 380/278 |
| 2011/0069940 A1 | 3/2011 | Shimy et al. | |
| 2011/0202968 A1* | 8/2011 | Nurmi | G06F 21/10 |
| | | | 726/1 |
| 2012/0060176 A1 | 3/2012 | Chai et al. | |
| 2012/0250951 A1 | 10/2012 | Chen | |
| 2013/0011068 A1* | 1/2013 | Albouyeh | G06F 21/36 |
| | | | 382/190 |
| 2014/0109231 A1 | 4/2014 | Takaoka | |
| 2015/0106627 A1* | 4/2015 | Holman | G06F 21/602 |
| | | | 713/189 |
| 2015/0128158 A1 | 5/2015 | Wheatley | |
| 2015/0227782 A1 | 8/2015 | Salvador et al. | |
| 2016/0034704 A1* | 2/2016 | Shim | H04N 1/4486 |
| | | | 726/26 |
| 2017/0193282 A1 | 7/2017 | Valko et al. | |
| 2018/0014198 A1* | 1/2018 | Suh | H04W 4/90 |
| 2018/0046814 A1* | 2/2018 | Manoharan | G06F 21/602 |
| 2018/0189505 A1* | 7/2018 | Ghafourifar | G06F 21/6209 |
| 2019/0384924 A1* | 12/2019 | Adams | G06F 21/6254 |

FOREIGN PATENT DOCUMENTS

| | | |
|---|---|---|
| WO | 2014158508 | 10/2014 |
| WO | 2016/017975 | 2/2016 |

OTHER PUBLICATIONS

"1 Beyond AutoTracker", AutoTracker Camera; http://1beyond.com/autotracker; Unknown publication date but prior to filing of present application.

"Cisco TelePresence SpeakerTrack 60", Cisco; Available at https://cicso.com; Unknown Publication Date prior to filing of present application.

"Eyeworks: Multi-Display Module—Software", Multi-Display eye tracking for applied research; Available at http://www.eyetracking.com/Software/EyeWorks/Multi-Display; Unknown Publication Date but prior to filing of present application.

"How to Copyright Photographs", Published on WikiHow; https://www.wikihow.com/Copyright-Photographs ; Exact Publication Date Unknown but prior to filing of present application.

"Inventor Identified Prior Art", Microsoft Office 16; Remember feature; Unknown publication date but prior to filing of present application.

"Inventor Identified Prior Art", Video functionality to continue or restart after asleep; Unknown source; Unknown publication date but prior to filing of present application.

"JPEG Roatation and EXIF Orientation", Instructions published on Impulse Adventure Website; https://www.impulseadventure.com/photo/exif-orientation.html ; Exact Publication Date unknown but prior to filing of present application.

"Logo Licious", Logo Licious—Add your own logo, watermark, and text to photos; App available on GooglePlay; Initial Publicaiton Unknown; Updated Mar. 2, 2018.

"Soloshot—Your Personal Robot Cameraman", Soloshot; Available at https://soloshot.com; Unknown publication date but prior to filing of present application.

Bailey, Jonathan , "Adding Copyright to Exif Automatically", Article Published on website Plagiarism Today; https://www.plagiarismtoday.com/2009/03/26/adding-copyright-to-exif-automatically/ ; Published Mar. 26, 2009.

Doerrfeld, Bill , "20+ Emotion Recognition APIs That Will Leave You Impressed, and Concerned", Blog; Posted at https://nordicapis.com/author/billdoerrfeld/ ; Posted Dec. 31, 2015.

Peters, Richard , "Add copyright info to your photos EXIF", Richard Peters Wildlife Photography; Available at https://www.richardpeters.co.uk/quick-tip-add-copyright-info-to-your-photos-exif/ ; Unknown Publication Date but prior to filing of present application.

Wilhelm, Parker , "Try Google's emotion-detecting image API for yourself", Article published on TechRadar; www.techradar.com; Published Feb. 18, 2016.

Exner, Karin , "PCT Search Report and Written Opinion", PCT/US2019/023928; Filed Mar. 25, 2019; dated May 13, 2019.

Unidentified list of Prior Art describing current capabilities to share images based on permissions; Provided by Inventor; Unknown date of publication, assumed to be prior to filing of present application.

Priyanu, Pakpum , "Search Report and Written Opinion", PCT/US2019/013362; Filed Jan. 11, 2019; dated Mar. 8, 2019.

\* cited by examiner

ELECTRONIC DEVICES AND METHODS FOR BLURRING AND REVEALING PERSONS APPEARING IN IMAGES

BACKGROUND

Technical Field

This disclosure relates generally to electronic devices, and more particularly to electronic devices with imagers.

Background Art

Modern portable electronic communication devices including numerous features beyond those associated with simply making voice telephone calls. Smartphones, for example, can be used to send text messages or multimedia messages, capture videos, make financial transactions, and surf the Internet. A modern smartphone places more computing power in a pocket than was offered by large desktop computers of only a decade ago.

With all of this computing power, users of such devices are storing more and more personal data in the devices. Health information, password lists, credit card numbers, shopping lists, and the like are routinely stored in a smartphone. It would be advantageous to have an improved device to capture such data.

Figure 1:
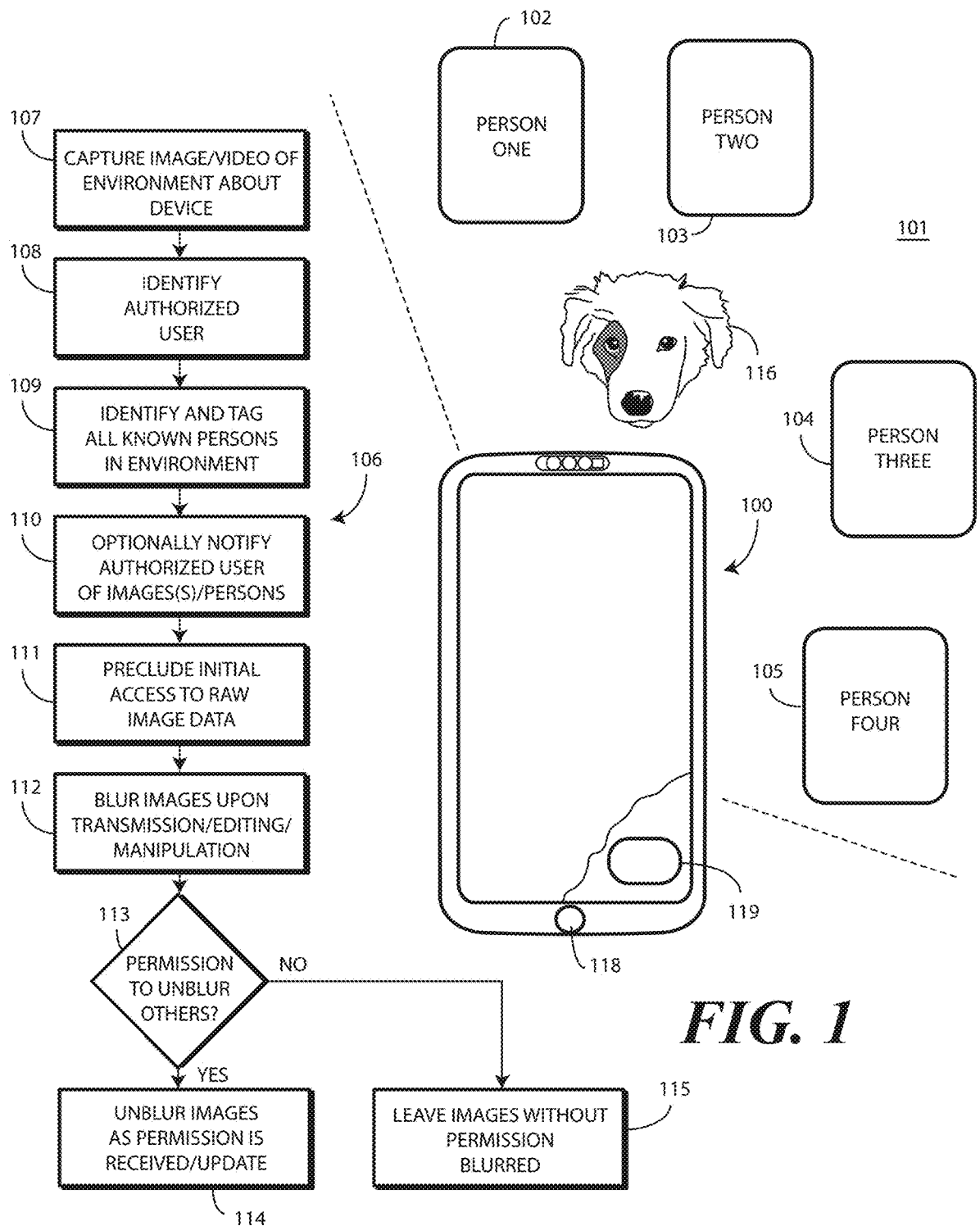
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to selectively blurring faces of one or more persons in images captured by an imager, and then revealing those images upon receipt of the associated permission. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of selectively blurring images of persons to protect their privacy as described herein, and then unblurring upon receipt of permission. The non-processor circuits may include, but are not limited to, a radio receiver, a radio transmitter, signal drivers, clock circuits, power source circuits, and user input devices. As such, these functions may be interpreted as steps of a method to perform the selective blurring prior to receipt of permission and then unblurring after receiving permission. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a method in an electronic device of maintaining privacy of persons captured in images until a reveal permission instruction is received. In one or more embodiments, an imager of an electronic device captures one or more images of an environment of the electronic device. Embodiments of the disclosure contemplate that one or more persons may be in the captured images. As such, after the imager captures the image, in one or more embodiments one or more processors of the electronic device blur at least a face of at least one person of the plurality of persons appearing in the one or more images. In one or more embodiments, this is to protect the privacy of those persons. The blurring can be based upon the identity of the individuals, whether they have granted permission to be photographed, or other factors.

In one or more embodiments, the one or more processors can then receive a reveal permission instruction from one or more of the persons who have been blurred in the image. This reveal permission instruction allows the unblurring of the depictions of those individuals appearing in the image from which the reveal permission instruction is received.

Embodiments of the disclosure contemplate that this reveal permission instruction can be granted in a variety of ways. Of course, permission can be granted directly when the individuals transmit the reveal permission instruction to the electronic device capturing the image via an electronic message or other electronic communication. However, to provide a more seamless experience to the user, embodiments of the disclosure provide many other more "passive" ways to grant the reveal permission instruction as well.

Illustrating by example, in one embodiment the electronic device capturing the image transmits the image to one or more remote electronic devices belonging to persons who are blurred in the captured image. If the electronic device capturing image detects that one or more of the remote electronic devices belonging to the persons who are blurred in the captured image then share the image with other remote electronic devices, in one or more embodiments this "resharing" of the image is interpreted by the device capturing the image as receipt of a reveal permission instruction. Accordingly, the electronic device capturing the image then unblurs the sharing owner's depiction in the image. The presumption is that the sharing owner would not retransmit the image if they did not want their depiction in that image to be unblurred. Accordingly, in one or more embodiments, sharing of the image by an electronic device other than the device capturing the image automatically grants a reveal permission instruction to the electronic device capturing the image. The electronic device capturing the image then acts to unblur the depiction of the owner of the electronic device sharing the image.

Expounding on this embodiment, consider the situation in which the owner of an electronic device capturing an image of a plurality of persons within an environment of the electronic device then shares the captured image with a remote electronic device belonging to another person who appears in the image. If that other person also shares the image, in one or more embodiments this is construed as consent to any privacy being released. The assumption is that if the other person wanted to remain private, they would not have shared the image. In one or more embodiments, to complete the privacy release following the other person sharing the image, the other person must authenticate themselves to their electronic device. This can occur via touchless authentication in the background in one or more embodiments.

In one or more embodiments, when the other person shares the image, the owner of the electronic device capturing the image is notified and/or is able to see the unblurred depiction of the person sharing the image. This can occur while depictions of those who have not granted privacy are kept individually blurred. Advantageously, while the owner of the device capturing the image is looking at the image, the depiction of the other person sharing the image is seamlessly determined in the background. The depiction of that person is then unblurred along with any other content belonging to that person as well.

If this now "unblurred" individual then shares the same image with a third person, the process can repeat. If the third person shares the image with someone else, this automatically grants permission to unblur the third person, and so forth. In one or more embodiments, when the owner of the device capturing the image shares the image with all persons appearing in, and blurred from, the image, these depictions can be unblurred when each person selects "reply to all."

In another embodiment, when the electronic device capturing the image shares the image with a second person, a prompt requesting permission to unblur can be presented on the second device in conjunction with the image itself. For instance, in one or more embodiments the electronic device capturing the image transmits the to a remote electronic device and prompts the remote electronic device for a reveal permission instruction. The owner of the remote electronic device can then provide, or withhold, the reveal permission instruction. If the reveal permission instruction is provided, the depiction of the owner of the remote device in the image can be unblurred. If the reveal permission is not provided, the depiction of the owner in the image can remain blurred.

Thus, if a recipient receiving the image selects "yes" or provides some other form of reveal permission instruction, their depiction in the image are now classified as sharable, are unblurred, and are therefore made visible to others. All recipients who provide such a reveal permission instruction are unblurred as well. When a group receives an image containing blurred depictions of individuals, each individual may be prompted for a reveal permission instruction. In one or more embodiments, each time an individual grants a reveal permission instruction, a key is automatically transmitted to unblur their depiction in the image. Thus, in one or more embodiments, providing a reveal permission instruction causes a key or other unblurring tool to be delivered to the electronic device providing the reveal permission instruction.

In still another embodiment, individuals can provide a reveal permission instruction in advance. For example, an electronic device may confirm the identities of one or more persons appearing in the image. If those persons have previously provided a permanent or temporary reveal permission instruction, their depictions in the image may not be blurred at all. These depictions belonging to identified individuals that have previously granted and/or consented to be unblurred are kept unblurred to owner in newly captured images.

Thus, in one or more embodiments, an image privacy method in an electronic device displays blurred subject(s) in an image. In one or more embodiments, this blurring can be a function of the identity of the individual(s) and associated permissions, thereby ensuring that persons who have not granted permission are blurred and are thus not identifiable. Reveal permission instructions can be provided and/or granted by persons in the image directly, e.g., when prompted or when providing permissions in advance. Alternatively, the reveal permission instructions can be provided indirectly, such as by "re-sharing" an image, replying to a shared image, or via previous communications.

Other features can be included as well. For example, in one or more embodiments an electronic device capturing an image can attempt to identify individuals appearing in that image. Where individuals can be identified, they can be tagged. This tagging operation can identify recipients to whom the image should be sent to request a reveal permission instruction. Additionally, while keys can be used to unblur depictions of individuals in images, other techniques, such as synching reveal permission instructions in the cloud or on a server, can also be used.

In one or more embodiments, an electronic device includes an imager and one or more processors operable with the imager. The imager can capture an image of one or more persons. The one or more processors then blur depictions of one or more persons appearing in the image until a reveal permission instruction is detected. However, after a reveal permission instruction is received from a remote electronic device, in one or more embodiments the one or more processors can unblur the depictions of persons from which the reveal permission instruction is received.

In one or more embodiments, to passively obtain the reveal permission instruction, a communication circuit, operable with the one or more processors, can transmit the image to at least one remote electronic device belonging to at least one of the persons appearing in the image. If a receiving remote electronic device then retransmits the image, in one or more embodiments this constitutes receipt of the reveal permission instruction from the retransmitting device. Accordingly, the one or more processors can unblur the depictions of persons from which the reveal permission instruction is received.

In another embodiment, the communication circuit transmits the image to at least one remote electronic device belonging to at least one of the persons appearing in the image. The communication circuit further prompts the owner of the at least one remote electronic device for the reveal permission instruction. If a recipient receiving the image selects "yes" or provides some other form of reveal permission instruction, their depiction in the image are now classified as sharable, are unblurred, and are therefore made visible to others. All recipients who provide such a reveal permission instruction are unblurred as well.

Turning now to FIG. 1, illustrated therein is one explanatory system 100 in accordance with one or more embodiments of the disclosure. An electronic device 100 is positioned within an environment 101. A plurality of persons 102,103,104,105 is situated within the environment 101 of the electronic device 100. Here, there are four persons 102,103,104,105 situated within the environment of the electronic device 100. Each person 102,103,104,105 is having a conversation about their favorite dog, Buster 116. Person 102 is an authorized user of the electronic device 100, while persons 103,104,105 are unauthorized users of the electronic device 100.

The electronic device 100 includes various sensors. These sensors can include an imager system, an audio sensor, proximity detectors, orientation sensors, a location detector, a context sensor, or other sensors. The electronic device 100 also includes on or more processors that are operable with the one or more sensors. In one or more embodiments, the one or more sensors are operable to detect a plurality of persons 102,103,104,105 within a predefined environment 101 about the electronic device 100. As will be described in more detail below, the one or more sensors, in conjunction with one or more processors, can also identify at least one person 102 of the plurality of persons 103,104,105 as an authorized user of the electronic device 100.

In one or more embodiments, the one or more sensors, in conjunction with the one or more processors, can also identify one or more of the plurality of persons 103,104,105 as well. If, for example, person 104 is a good friend of person 102, and is frequently within the environment 101 of the electronic device 100, the one or more sensors and/or one or more processors may be able to identify that person 104 as well. While the person 104 will not be identified as the authorized user of the electronic device 100, they may still be identified for other purposes, as will be explained in more detail below.

Figure 2:
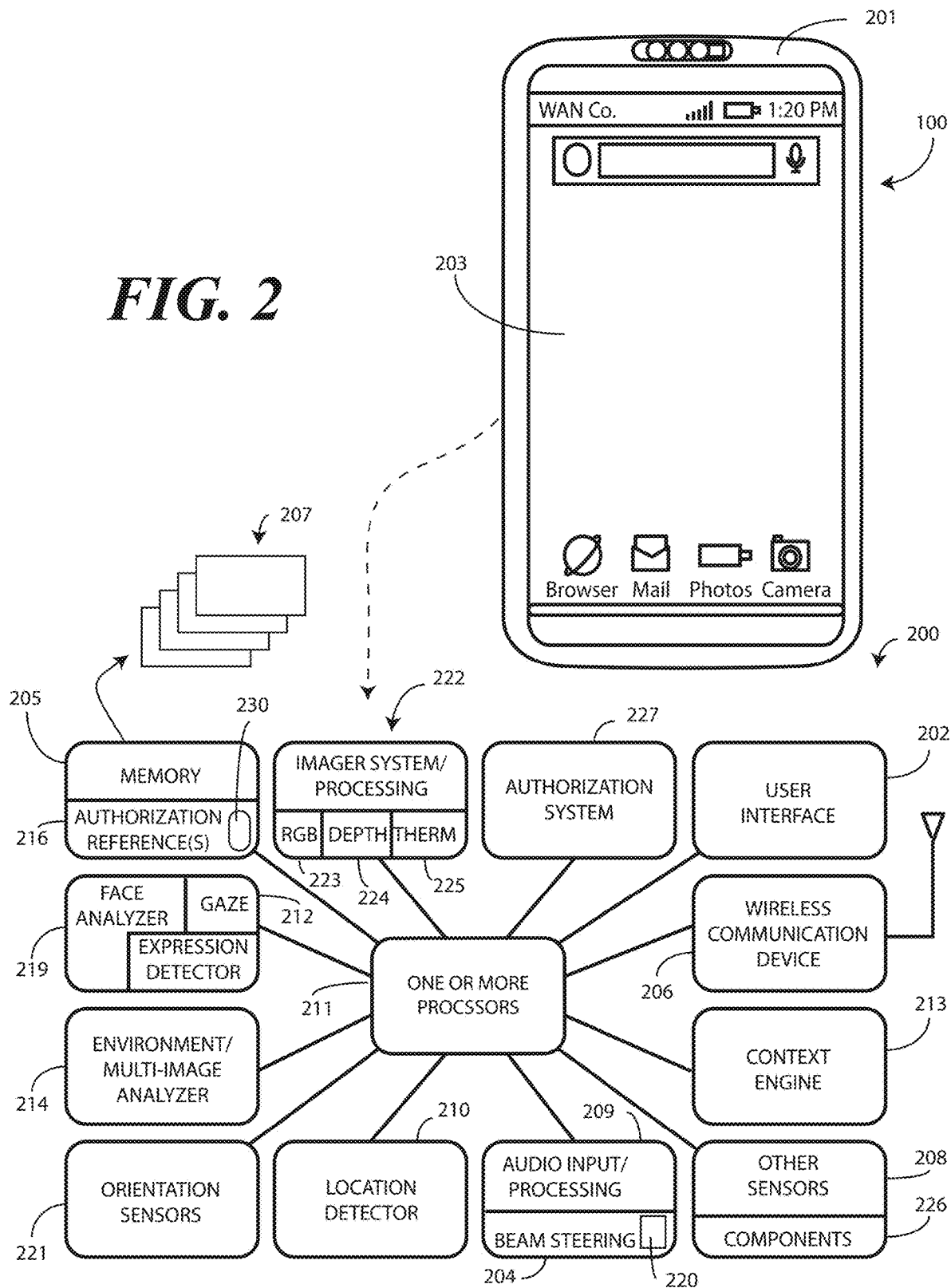
FIG. 2 illustrates one explanatory electronic device in accordance with one or more embodiments of the disclosure.

Turning briefly to FIG. 2, illustrated therein is one explanatory block diagram schematic 200 of the explanatory electronic device 100 of FIG. 1. In one or more embodiments, the block diagram schematic 200 is configured as a printed circuit board assembly disposed within a housing 201 of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 includes a display 203, which may optionally be touch-sensitive. In one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMOLED) display. However, it should be noted that other types of displays, including liquid crystal displays, suitable for use with the user interface 202 would be obvious to those of ordinary skill in the art having the benefit of this disclosure.

In one embodiment, the electronic device includes one or more processors 211. In one embodiment, the one or more processors 211 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 205, can optionally store the executable software code used by the one or more processors 211 during operation.

In this illustrative embodiment, the block diagram schematic 200 also includes a communication circuit 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 206 can include wireless communication circuitry, one of a receiver, a transmitter, or transceiver, and one or more antennas.

In one embodiment, the one or more processors 211 can be responsible for performing the primary functions of the electronic device with which the block diagram schematic 200 is operational. For example, in one embodiment the one or more processors 211 comprise one or more circuits operable with the user interface 202 to present presentation information to a user. The executable software code used by the one or more processors 211 can be configured as one or more modules 207 that are operable with the one or more processors 211. Such modules 207 can store instructions, control algorithms, and so forth.

In one or more embodiments, the block diagram schematic 200 includes an audio input/processor 209. The audio input/processor 209 is operable to receive audio input from an environment (101) about the electronic device 100. The audio input/processor 209 can include hardware, executable code, and speech monitor executable code in one embodiment. The audio input/processor 209 can be operable with one or more predefined authentication references 216 stored in memory 205.

With reference to audio input, the predefined authentication references 216 can comprise representations of basic speech models, representations of trained speech models, or other representations of predefined audio sequences that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models stored with the predefined authentication references 216 to identify speech commands.

The audio input/processor 209 can include a beam steering engine 204 comprising one or more microphones 220. Input from the one or more microphones 220 can be processed in the beam steering engine 204 such that the one or more microphones define a virtual microphone. This virtual microphone can define an acoustic reception cone that can be virtually "steered" around the electronic device 100. Alternatively, actual steering can occur as well, such as switching between a left and right microphone or a front and back microphone, or switching various microphones ON and OFF individually. In one or more embodiments, two or more microphones 220 can be included for selective beam steering by the beam steering engine 204.

Illustrating by example, a first microphone can be located on a first side of the electronic device 100 for receiving audio input from a first direction, while a second microphone can be placed on a second side of the electronic device 100 for receiving audio input from a second direction. These microphones can be "steered" by selectively turning them ON and OFF.

The beam steering engine 204 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine 204 alerting it in which direction to focus the acoustic reception cone and/or steer the first microphone and the second microphone, thereby adding confirmation to audio steering and saving time. Where multiple people are around the electronic device 100, as was the case in FIG. 1, this steering advantageously directs a beam reception cone to the authorized user.

Alternatively, the beam steering engine 204 processes and combines the signals from two or more microphones to perform beam steering. The one or more microphones 220 can be used for voice commands. In response to control of the one or more microphones 220 by the beam steering engine 204, a user location direction can be determined. The beam steering engine 204 can then select between the first microphone and the second microphone to beam steer audio reception toward the user. Alternatively, the audio input/processor 209 can employ a weighted combination of the microphones to beam steer audio reception toward the user.

In one embodiment, the audio input/processor 209 is configured to implement a voice control feature that allows a user to speak a specific device command to cause the one or more processors 211 to execute a control operation. For example, the user may say, "Authenticate Me Now." This statement comprises a device command requesting the one or more processors to cooperate with the authentication system 227 to authenticate a user. Consequently, this device command can cause the one or more processors 211 to access the authentication system 227 and begin the authentication process. In short, in one embodiment the audio input/processor 209 listens for voice commands, processes the commands and, in conjunction with the one or more processors 211, performs a touchless authentication procedure in response to voice input.

The one or more processors 211 can perform filtering operations on audio input received by the audio input/processor 209. For example, in one embodiment the one or more processors 211 can filter the audio input into authorized user generated audio input, i.e., first audio input, and other audio input, i.e., second audio input.

Various sensors 208 can be operable with the one or more processors 211. A first example of a sensor that can be included with the various sensors 208 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 211, to detect an object in close proximity with—or touching—the surface of the display 203 or the housing 201 of the electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor 208 is a geo-locator that serves as a location detector 210. In one embodiment, location detector 210 is able to determine location data when authenticating a user. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 210 autonomously or with assistance from terrestrial base stations, for example those associated with a cellular communication network or other ground based network, or as part of a Differential Global Positioning System (DGPS), as is well known by those having ordinary skill in the art. The location detector 210 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 221 that determines an orientation and/or movement of the electronic device 100 in three-dimensional space. Illustrating by example, the orientation detector 221 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 221 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

An authentication system 227 is operable with the one or more processors 211. A first authenticator 222 of the authentication system 227 can include an imager 223, a depth imager 224, and a thermal sensor 225. In one embodiment, the imager 223 comprises a two-dimensional imager configured to receive at least one image of a person within an environment of the electronic device 100. In one embodiment, the imager 223 comprises a two-dimensional Red-Green-Blue (RGB) imager. In another embodiment, the imager 223 comprises an infrared imager. Other types of imagers suitable for use as the imager 223 of the authentication system will be obvious to those of ordinary skill in the art having the benefit of this disclosure.

The thermal sensor 225 can also take various forms. In one embodiment, the thermal sensor 225 is simply a proximity sensor component included with the other components 226. In another embodiment, the thermal sensor 225 comprises a simple thermopile. In another embodiment, the thermal sensor 225 comprises an infrared imager that captures the amount of thermal energy emitted by an object. Other types of thermal sensors 225 will be obvious to those of ordinary skill in the art having the benefit of this disclosure.

Figure 3:
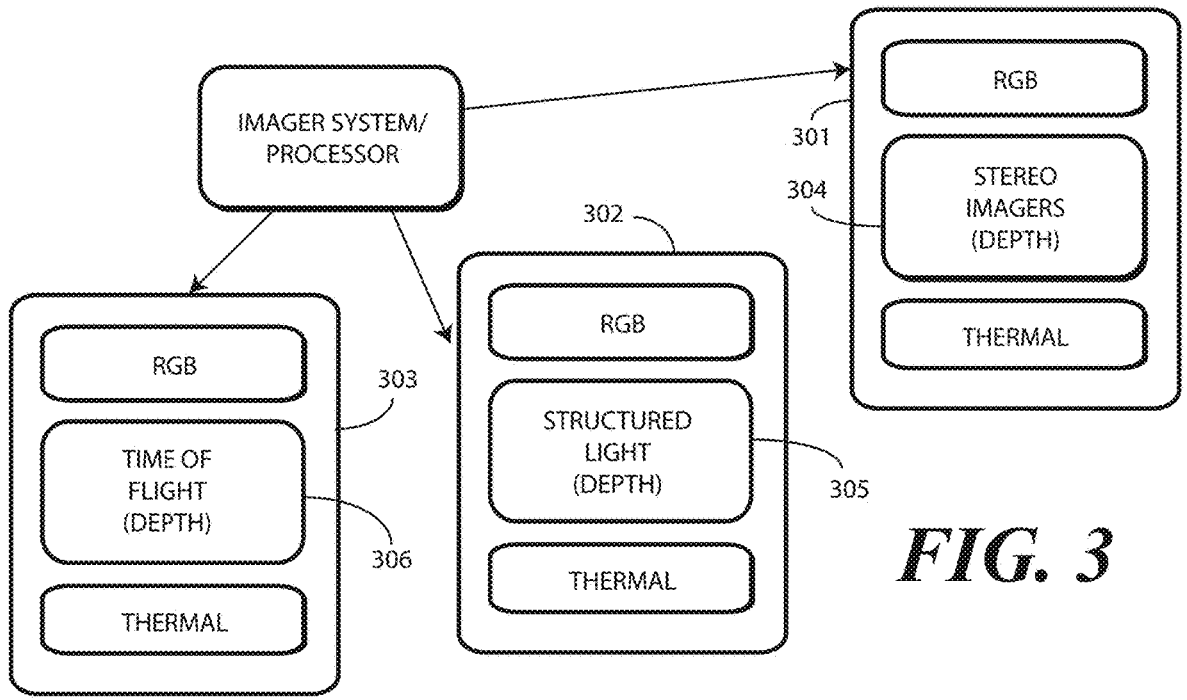
FIG. 3 illustrates various explanatory imaging systems suitable for use with explanatory electronic devices in accordance with one or more embodiments of the disclosure.

The depth imager 224 can take a variety of forms. Turning briefly to FIG. 3, illustrated therein are three different configurations of the first authenticator 222 of the authentication system (227), each having a different depth imager 224.

In a first embodiment 301, the depth imager 304 comprises a pair of imagers separated by a predetermined distance, such as three to four images. This "stereo" imager works in the same way the human eyes do in that it captures images from two different angles and reconciles the two to determine distance.

In another embodiment 302, the depth imager 305 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment 303, the depth imager 306 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 304,305,306 adds a third "z-dimension" to the x-dimension and y-dimension defining the two-dimensional image captured by the imager 223, thereby enhancing the security of using a person's face as their password in the process of authentication by facial recognition.

Turning back to FIG. 2, the authentication system 227 can be operable with a face analyzer 219 and an environmental analyzer 214. The face analyzer 219 and/or environmental analyzer 214 can be configured to process an image or depth scan of an object and determine whether the object matches predetermined criteria by comparing the image or depth scan to one or more predefined authentication references 216 stored in memory 205.

For example, the face analyzer 219 and/or environmental analyzer 214 can operate as an authentication module configured with optical and/or spatial recognition to identify objects using image recognition, character recognition, visual recognition, facial recognition, color recognition, shape recognition, and the like. Advantageously, the face analyzer 219 and/or environmental analyzer 214, operating in tandem with the authentication system 227, can be used as a facial recognition device to determine the identity of one or more persons detected about the electronic device 100.

These persons can be further identified as an identified, authorized user of the electronic device, or identified, non-authorized user of the electronic device 100. If, for example, the imager 223 has captured images and/or the depth imager 224 has captured depth scans of a friend of the authorized user, the authorized user can optionally deliver the user input to the user interface 202 to add identifying characteristics to this data, such as the person's name, relationship to the authorized user, and so forth. Accordingly, the face analyzer 219 and/or environmental analyzer 214 are capable of identifying a large number of persons where such identifying characteristics have been previously stored with the image or depth scan data, even though only one identifiable person may be authenticated as the authorized user of the electronic device 100.

In one embodiment when the authentication system 227 detects a person, one or both of the imager 223 and/or the depth imager 224 can capture a photograph and/or depth scan of that person. The authentication system 227 can then compare the image and/or depth scan to one or more predefined authentication references 216 stored in the memory 205. This comparison, in one or more embodiments, is used to confirm beyond a threshold authenticity probability that the person's face—both in the image and the depth scan—sufficiently matches one or more of the predefined authentication references 216 stored in the memory 205 to identify a person. Where the predefined authentication reference 216 indicates that the identified person is also the authorized user of the electronic device 100, the authentication system 227 can further authenticate that particular person as an authorized user of the electronic device 100.

Beneficially, this optical recognition performed by the authentication system 227 operating in conjunction with the face analyzer 219 and/or environmental analyzer 214 allows access to the electronic device 100 only when one of the persons detected about the electronic device 100 are sufficiently identified as an authorized user of the electronic device 100. However, at the same time, when the imager 223 captures an image of an environment (101) of the electronic device 100, and that environment (101) comprises one or more persons (102,103,104,105), the optical recognition performed by the authentication system 227 operating in conjunction with the face analyzer 219 and/or environmental analyzer 214 allows for the identification of any person who has corresponding identifying characteristics stored with the image or depth scan data in the memory 205. Thus, where four persons (102,103,104,105) are within the environment (101) of the electronic device 100, the optical recognition performed by the authentication system 227 operating in conjunction with the face analyzer 219 and/or environmental analyzer 214 may identify one as an authorized user of the electronic device 100, one as a friend of the authorized user, one as a cousin of the authorized user, and so forth.

In one or more embodiments the one or more processors 211, working with the authentication system 227 and the face analyzer 219 and/or environmental analyzer 214 can determine whether at least one image captured by the imager 223 matches a first predefined criterion, whether at least one facial depth scan captured by the depth imager 224 matches a second predefined criterion, and whether the thermal energy identified by the thermal sensor 225 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 211 use this information to identify a person when the at least one image matches the first predefined criterion, the at least one facial depth scan matches the second predefined criterion, and the thermal energy matches the third predefined criterion. Where the predefined authentication reference 216 indicates that the identified person is also the authorized user of the electronic device 100, the authentication system 227 can further authenticate that particular person as an authorized user of the electronic device 100.

In one or more embodiments, a user can "train" the electronic device 100 by storing predefined authentication references 216 in the memory 205 of the electronic device 100. Illustrating by example, a user may take a series of pictures. They can include identifiers of special features such as eye color, sink color, air color, weight, and height. They can include the user standing in front of a particular wall, which is identifiable by the environmental analyzer from images captured by the imager 223. They can include the user raising a hand, touching hair, or looking in one direction, such as in a profile view. These can then be stored as predefined authentication references 216 in the memory 205 of the electronic device 100. This can be done not only for an authorized user, but others as well as described above.

A gaze detector 212 can be operable with the authentication system 227 operating in conjunction with the face analyzer 219. The gaze detector 212 can comprise sensors for detecting the user's gaze point. The gaze detector 212 can optionally include sensors for detecting the alignment of a user's head in three-dimensional space. Electronic signals can then be processed for computing the direction of user's gaze in three-dimensional space. The gaze detector 212 can further be configured to detect a gaze cone corresponding to the detected gaze direction, which is a field of view within which the user may easily see without diverting their eyes or head from the detected gaze direction. The gaze detector 212 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 212 of FIG. 2.

The face analyzer 219 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 223 or the depth imager 224 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 226 operable with the one or more processors 211 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 226 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 201 of the electronic device 100. In one embodiment, the signal receiver is an infrared signal receiver to receive an infrared emission from an object such as a human being when the human is proximately located with the electronic device 100. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 211 can cause each proximity sensor component to operate at a first "effective" sensitivity so as to receive infrared emissions from a first distance. Similarly, the one or more processors 211 can cause each proximity sensor component to operate at a second sensitivity, which is less than the first sensitivity, so as to receive infrared emissions from a second distance, which is less than the first distance. The sensitivity change can be effected by causing the one or more processors 211 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 226 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 226 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 213 can then operable with the various sensors to detect, infer, capture, and otherwise determine persons and actions that are occurring in an environment about the electronic device 100. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information. The context engine 213 can comprise an artificial neural network or other similar technology in one or more embodiments.

In one or more embodiments, the context engine 213 is operable with the one or more processors 211. In some embodiments, the one or more processors 211 can control the context engine 213. In other embodiments, the context engine 213 can operate independently, delivering information gleaned from detecting multi-modal social cues, emotional states, moods, and other contextual information to the one or more processors 211. The context engine 213 can receive data from the various sensors. In one or more embodiments, the one or more processors 211 are configured to perform the operations of the context engine 213.

In one or more embodiments, the one or more processors 211 can be operable with the various authenticators of the authentication system 227. For example, the one or more processors 211 can be operable with a first authenticator and a second authenticator. Where more authenticators are included in the authentication system 227, the one or more processors 211 can be operable with these authenticators as well.

Turning now back to FIG. 1, a method 106 for the electronic device 100 is also shown. At step 107, the method 106 captures, with an image capture device such as imager (223) of the electronic device 100, one or more images 117 of a plurality of persons 102,103,104,105 within the environment 101 of the electronic device. The one or more processors can then use the face analyzer (219) and/or environmental analyzer (214) to determine that there are depictions of the one or more persons 102,103,104,105 in the one or more images 117.

Alternatively, other techniques to determine that there are depictions of the one or more persons 102,103,104,105 in the one or more images 117. For example, an audio sensor such as the audio input/processor (209) of the electronic device 100 can capture audio input from the environment 101 of the electronic device 100, and can use this audio input to detect that there are depictions of one or more of the persons 102,103,104,105 within the environment 101. When the audio input includes multiple voices, such as the voice from a man and a voice from a woman, the one or more processors (211) can perform audio processing on the audio input to determine that there are multiple speakers within the environment 101 of the electronic device 100, and therefore, that there are likely to be depictions of multiple persons 102,103,104,105 in the one or more images 117. Other techniques for detecting that there are depictions of one or more persons within the environment 101 will be obvious to those of ordinary skill in the art having the benefit of this disclosure.

At step 108, the method 106 can identify, using the one or more sensors (208), an authorized user of the electronic device 100 in the plurality of persons 102,103,104,105. Here, the method 106 can identify that person 102 is an authorized user of the electronic device 100, while persons 103,104,105 are unauthorized users of the electronic device 100. This identification can occur in a variety of ways.

Illustrating by example, in one embodiment the electronic device 100 can perform "touchless" authentication of person 102 as the authorized user in that person 102 need not manipulate or interact with the electronic device 100 using his fingers. To the contrary, in accordance with one or more embodiments of the disclosure, the user is identified and authenticated using a combination of two-dimensional imaging, depth scan imaging, thermal sensing, and optionally one or more higher authentication factors.

For instance, the imager (223) can capture at least one image of any of the persons 102,103,104,105 within the environment 101 of the electronic device 100. Capturing an image of person 102, for example, would capture a picture of the authorized user of the electronic device 100. In one embodiment, the imager (223) captures a single image of the persons 102,103,104,105. In another embodiment, the imager (223) captures a plurality of images of the persons 102,103,104,105. In one or more embodiments, the one or more images are each a two-dimensional image. For example, in one embodiment the image is a two-dimensional RGB image. In another embodiment, the image is a two-dimensional infrared image. Other types of two-dimensional images will be obvious to those of ordinary skill in the art having the benefit of this disclosure.

In one or more embodiments, the image can be compared to one or more predefined reference images stored in a memory of the electronic device 100. By making such a comparison, the one or more processors (211) can confirm whether the shape, skin tone, eye color, hair color, hair length, and other features identifiable in a two-dimensional image are that of the authorized user identified by the one or more predefined reference images.

In addition to the imager (223) capturing the image, in one or more embodiments a depth imager (224) captures at least one depth scan of the object when situated within the environment 101 of the electronic device 100. In one embodiment, the depth imager (224) captures a single depth scan of the persons 102,103,104,105. In another embodiment, the depth imager (224) captures a plurality of depth scans of the persons 102,103,104,105.

As described above with reference to FIG. 3, the depth imager (224) can take any of a number of forms. These include the use of stereo imagers, separated by a predefined distance, to create a perception of depth, the use of structured light lasers to scan patterns—visible or not—that expand with distance and that can be captured and measured to determine depth or projecting different patterns, time of flight sensors that determine how long it takes for an infrared or laser pulse to translate from the electronic device 100 to the various persons 102,103,104,105 and back. Other types of depth imagers will be obvious to those of ordinary skill in the art having the benefit of this disclosure. However, in each case, the depth scan creates a depth map of a three-dimensional object, such as the face of one or more of the persons 102,103,104,105. This depth map can then be compared to one or more predefined facial maps stored in the memory of the electronic device 100 to confirm whether the contours, nooks, crannies, curvatures, and features of the face of any of the persons 102,103,104,105 are that of the authorized user identified by the one or more predefined facial maps.

In one or more embodiments, the image(s) and the depth scan are used in combination for authentication purposes. Illustrating my example, in one or more embodiments one or more processors (211) of the electronic device 100 compare the image with the one or more predefined reference images. The one or more processors (211) then compare the depth scan with the one or more predefined facial maps. Identification and authentication will fail in one or more embodiments unless the image sufficiently corresponds to at least one of the one or more predefined images and the depth scan sufficiently corresponds to at least one of the one or more predefined facial maps. As used herein, "sufficiently" means within a predefined threshold. For example, if one of the predefined images includes five hundred reference features, such as facial shape, nose shape, eye color, background image, hair color, skin color, and so forth, the image will sufficiently correspond to at least one of the one or more predefined images when a certain number of features in the image are also present in the predefined images. This number can be set to correspond to the level of security desired. Some authorized users may want ninety percent of the reference features to match, while other users will be content if only eighty percent of the reference features match, and so forth.

As with the predefined images, the depth scan will sufficiently match the one or more predefined facial maps when a predefined threshold of reference features in one of the facial maps is met. In contrast to two-dimensional features found in the one or more predefined images, the one or more predefined facial maps will include three-dimensional reference features, such as facial shape, nose shape, eyebrow height, lip thickness, ear size, hair length, and so forth. As before, the depth scan will sufficiently correspond to at least one of the one or more predefined facial maps when a certain number of features in the depth scan are also present in the predefined facial maps. This number can be set to correspond to the level of security desired. Some users may want ninety-five percent of the reference features to match, while other users will be content if only eighty-five percent of the reference features match, and so forth.

The use of both the image and the depth scan as combined authentication factors can be better than using one or the other alone. The depth scan adds a third "z-dimension" to the x-dimension and y-dimension data found in the image, thereby enhancing the security of using the face of the authorized user, here person 102, as their password in the process of authentication by facial recognition. Another benefit of using the depth scan in conjunction with the image is the prevention of someone "faking" the imager (223) acting alone by taking an image of a picture of person 102, rather than person 102 themselves. Illustrating by example, if only the imager (223) is used, a nefarious person trying to get unauthorized access to the electronic device 100 may simply snap a picture of a two-dimensional photograph of person 102. The use of a depth scan in conjunction with the image prevents this type of chicanery by requiring that a three-dimensional person 102, i.e., the actual user, be present and within the environment before the authentication system of the electronic device authenticates the person 102 as the authorized user of the electronic device 100.

One or more embodiments of the present disclosure further require a thermal sensor (225) to detect an amount of thermal energy received from one or more of the persons 102,103,104,105 when situated within a thermal reception radius of the electronic device 100. In one or more embodiments, only where the amount of thermal energy received form the object is within a predefined temperature range will authentication occur, and thus access be granted. Advantageously, this prevents the use of three-dimensional masks from "tricking" the authentication system by masquerading as the actual user, i.e., person 102 in this case. Thus, in one or more embodiments, the one or more processors (211) determine whether the amount of thermal energy received from the object, which in this case is person 102, is within the predefined temperature range.

In one or more embodiments, authentication occurs where each of the following is true: the at least one image sufficiently corresponds to at least one of the one or more predefined images; the at least one depth scan sufficiently corresponds to at least one of the one or more predefined facial maps; and the amount of thermal energy received from the object is within the predefined temperature range. Where all three are true, in one or more embodiments, person 102 is authenticated as a user authorized to use the electronic device 100.

In one or more embodiments, when the authentication fails, i.e., where none of the persons 102,103,104,105 is identified and authenticated as the authorized user for whatever reason, the one or more processors (211) can lock or limit full access the electronic device 100 to preclude access to it or the information stored therein. For example, if the at least one image fails to sufficiently correspond to at least one of the one or more predefined images the one or more processors (211) can lock the electronic device 100 to preclude access to it or reduce access or the information stored therein.

Similarly, if the at least one depth scan fails to correspond to at least one of the one or more predefined facial maps, the one or more processors (211) can lock the electronic device 100 to preclude access to it or the information stored therein. If a mask is being used to spoof the system, and the amount of thermal energy received from the object fails to fall within the predefined temperature range, the one or more processors (211) can lock the electronic device 100 to preclude access to it or the information stored therein. When the electronic device 100 is locked, the one or more processors (211) may then require additional authentication factors beyond the image, the depth scan, and the amount of thermal energy to authenticate a user at the next authentication cycle.

As noted above, in one embodiment the imager (223) captures a single image of the persons 102,103,104,105, while in other embodiments the imager (223) captures a plurality of images of the persons 102,103,104,105. Similarly, the depth imager (224) can capture a single depth scan of the persons 102,103,104,105 in one embodiment, while in other embodiments the depth imager (224) captures a plurality of depth scans of the persons 102,103,104,105.

The use of either the plurality of images or the plurality of depth scans advantageously allows additional authentication factors to be integrated into the system. Illustrating by example, the use of either the plurality of images or the plurality of depth scans allows for the detection of movement of the object between instances of either the plurality of images or the plurality of depth scans.

In another embodiment, step 108 of the method 106 can identify the authorized user using a fingerprint sensor 118. The fingerprint sensor 118 can capture a fingerprint image that can be used to authenticate a user of an electronic device 100. As used herein, a fingerprint image refers to a digital image and/or any other type of data representing the print pattern features that distinctly identify a user by a fingerprint of a finger. The fingerprint sensor 118 can also include a presence sensor that periodically detects a presence of a warm object near the fingerprint sensor. In implementations, a fingerprint sensor 118 can also be implemented to detect user presence, rather than implementing a separate presence sensor.

In another embodiment, step 108 of the method 106 can identify the authorized user using a pincode receiver. The pincode receiver can receive a Personal Identification Number (PIN) code or a pass code from a user.

In another embodiment, step 108 of the method 106 can identify the authorized user using a voice recognition engine 119. The voice recognition engine 119 can comprise executable code, hardware, and various voice print templates (also referred to as "voice models"). The voice recognition engine 119 can use the voice print templates to compare a voiceprint from received input and determine if a match exists. In operation, the voice recognition engine 119 obtains voice data using at least one microphone (220) The voice recognition engine 119 can extract voice recognition features from the voice data and generate a voiceprint. The voice recognition engine 119 can compare the voiceprint to at least one predefined authentication reference, which may comprise a predefined voice print template.

In another embodiment, step 108 of the method 106 can identify the authorized user using an iris scanner. The iris scanner can capture images and/or thermal or infrared scans of a person's iris. The iris scanner can employ either or both of visible and near-infrared light. The iris scanner can capture high-contrast images of a person's iris, and can compare these images to one or more predefined authentication references to determine if there is a match to determine that a person is an authorized user of an electronic device 100.

The examples set forth above are merely illustrative of various authenticators that can be used with electronic devices in accordance with one or more embodiments of the disclosure to identify an authorized user at step 108 of the method 106. The authenticators can be used in alone or in combination. The authenticators are illustrative only, and are not intended to provide a comprehensive list of authenticators. Numerous other authenticators will be obvious to those of ordinary skill in the art having the benefit of this disclosure.

As noted above, in addition to identifying the authorized user of the electronic device 100, in one or more embodiments the electronic device 100 can use the same process further identify some or all of the unauthorized users provided the electronic device 100 has been previously trained. To wit, when the imager (223) captures one or more images 117 of the environment 101 of the electronic device 100, and that environment 101 comprises one or more persons 102, 103, 104, 105, the optical recognition performed by the authentication system (227) operating in conjunction with the face analyzer (219) and/or environmental analyzer (214) allows for the identification of any person who has corresponding identifying characteristics stored with the image or depth scan data in the memory (205). Thus, where four persons 102, 103, 104, 105 are within the environment 101 of the electronic device 100, the optical recognition performed by the authentication system (227) operating in conjunction with the face analyzer (219) and/or environmental analyzer (214) may identify one as an authorized user of the electronic device 100, one as a friend of the authorized user, one as a cousin of the authorized user, and so forth.

Thus, in one or more embodiments, the method 106 comprises identifying all identifiable persons 103, 104, 105 as unauthorized users at step 109. Said differently, in one embodiment step 109 includes identifying, with one or more sensors, an authorized user and at least one unauthorized user of the electronic device in the plurality of persons.

For those persons 103, 104, 105 that can be identified, step 109 can optionally include "tagging" those persons 103, 104, 105 in the one or more images 117. As the term is used in the art, "tagging" means attaching a keyword or phrase to a portion of content, or to assign a portion of content to a specific person. Illustrating by example, where the one or more images 117 include depictions of the plurality of persons 102, 103, 104, 105, the optional tagging occurring at step 109 can include assigning a name to those depictions of persons 102, 103, 104, 105 who can be identified. Tags can be applied to voices, communications, and other data as well.

This tagging allows numerous functions to occur. Illustrating by example, in one embodiment the one or more processors (211) tag depictions of persons 102, 103, 104, 105 who can be identified. The names of these persons 102, 103, 104, 105 can then be presented to the authorized user as a list on the display 203. A message might say, "Captured an image of you with Peter, Matt, and Rachid last night. Would you like to view or share it?" Thus, in one or more embodiments where step 109 comprises identifying, with one or more sensors, one or more persons and tagging those persons, step 109 can also include presenting, on a user interface (202) with the one or more processors (211), an identification of the one or more persons.

Such a message, which identifies the persons 102, 103, 104, 105 by name, is helpful to the authorized user because it informs the authorized user who appears in the one or more images 117. Additionally, should the authorized user desire to share the one or more images 117 with others, the tags identify potential recipients of the one or more images 117 since depictions of these persons 102, 103, 104, 105 appear in the one or more images 117. Thus, at step 110, the method 106 can optionally notify the authorized user of any captured images. Additionally, where identification and tagging occurs at step 109, step 110 can include notifying the authorized user of one or more persons 103, 104, 105 who have been identified by name.

While all persons 103, 104, 105 other than the authorized user are identifiable in this explanatory example, it is contemplated that there will be situations in which fewer than all persons 103, 104, 105 can be identified. Where this is the case, step 110 can include notifying the authorized user of a subset of the plurality of persons 103, 104, 105, where that subset includes only those who have been identified and tagged.

At optional step 111, the method 106 can include precluding access to the raw image file data associated with the one or more images 117. As noted above, embodiments of the disclosure provide a method in an electronic device 100 of maintaining privacy of persons 103, 104, 105 captured in images 117 until a reveal permission instruction is received. Accordingly, in one or more embodiments when an imager (223) of an electronic device 100 captures one or more images 117 of an environment 101 of the electronic device 100 that includes one or more persons 102, 103, 104, 105, one or more processors (211) of the electronic device 100 blur at least a face of at least one person of the plurality of persons 103, 104, 105 appearing in the one or more images 117 to protect the privacy of those persons.

To ensure that hackers or other miscreants cannot unblur the faces without the reveal permission instruction from those persons 103, 104, 105 is received, in one or more embodiments step 111 precludes even the authorized user from having access to the raw image file data. Said differently, in one or more embodiments the images 117 each comprise wherein a digital negative consisting of the raw data file and a corresponding photographic rendering suitable for viewing on a display 203 or other device. In one or more embodiments, step 111 comprises precluding, with the one or more processors (211), access to the digital negative in the electronic device 100 until permission is received from each person of the plurality of persons appearing in the image 117 is received.

Those of ordinary skill in the art will understand that images captured by an imager (223) include a raw image file that includes minimally processed data from the image sensor of the imager (223). Only after those raw image files are processed with a bitmap graphics editor can they be printed or edited. Accordingly, in one or more embodiments the one or more processors (211) store the raw image file in a secure location of the memory (205), thereby precluding access to the same. This ensures that blurred faces or other depictions of persons 103,104,105 are not unblurred without the reveal permission instruction. In one or more embodiments, even the owner of the electronic device 100 has no access to the raw image file. It is instead kept internal to electronic device 100.

At step 112, the method 106 blurs at least one face of at least one person of the plurality of persons 103,104,105 appearing in the one or more images 117. In one or more embodiments, this can occur prior to presentation of the one or more images 117 on the display 203 or other user interface (202). Additionally, in one or more embodiments this occurs prior to electronic transmission of the one or more images 117. In other embodiments, the authorized user, being the owner of the one or more images 117, will be able to see the one or more images in an unblurred state. However, should the authorized user attempt to transmit or otherwise move the one or more images 117 from the electronic device 100, the blurring will occur prior to the transmission or saving to an alternate device. In one or more embodiments, step 112 comprises the blurring only occurring only upon transmitting the one or more images 117 to the remote electronic device.

Continuing the present example, i.e., where four persons 102,103,104,105 are within the environment 101 of the electronic device 100 and the optical recognition performed by the authentication system (227) operating in conjunction with the face analyzer (219) and/or environmental analyzer (214) identifies person 102 as the authorized user and persons 103,104,105 as identified unauthorized users of the electronic device 100, one or more processors (211) of the electronic device 100 will blur at least the face of each of the persons 103,104,105 other than the authorized user. The presumption is that the authorized user, by viewing the one or more images 117, consents to being able to see their own face. Thus, in one or more embodiments, step 112 will further include precluding the blurring of the authorized user in the one or more images 117, and will instead include blurring [001] at least one unauthorized user of the electronic device 100.

Once this occurs, the other persons 103,104,105 can deliver reveal permission instructions to the electronic device 100, as will be described in more detail below with reference to FIGS. 6-9. Whether this reveal permission instruction is received, i.e., whether permission from the other persons 103,104,105 to reveal their blurred parts, e.g., a blurred face, in the one or more images 117 is determined at decision 113.

Where it is, the method 106 includes revealing, by the one or more processors, the blurred part, e.g., the blurred face, of the person sending the reveal permission instruction at step 114. In one embodiment, the blurred part of the person transmitting the reveal permission instruction occurs when the one or more processors cause the blurred portion of the one or more images 117 to become unblurred. Unblurring can occur by accessing the raw image file stored in the memory (205) and restoring the blurred portions to unblurred portions.

Embodiments of the disclosure contemplate that the reveal permission instruction can be granted by the persons 103,104,105 appearing, and blurred, in the one or more images 117 in a variety of ways. In a simple embodiment, permission can be granted directly when the persons 103, 104,105 transmit the reveal permission instruction to the electronic device 100 via an electronic message or other electronic communication. However, to provide a more seamless experience to the user, embodiments of the disclosure provide many other more "passive" ways to grant the reveal permission instruction as well. FIG. 6-9 illustrate some of these more passive options for receiving the reveal permission instruction at decision 113.

Figure 6:
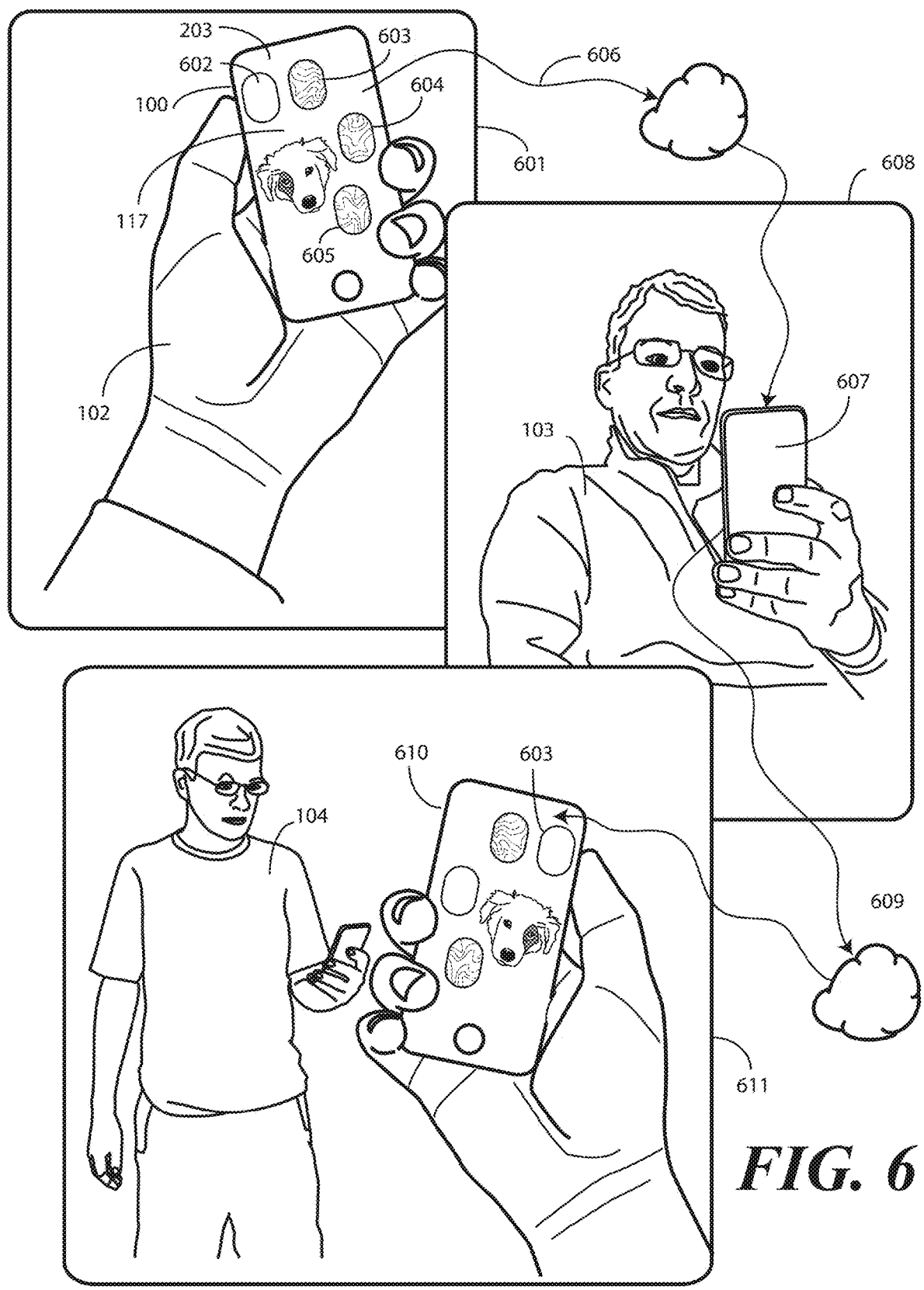
FIG. 6 illustrates one or more method steps in accordance with one or more embodiments of the disclosure.

Beginning with FIG. 6, illustrated therein is a first embodiment for receiving a reveal permission instruction. At step 601 person 102 has captured an image 117 that includes depictions 602,603,604,605 of four persons 102, 103,104,(105) in an environment (101) of the electronic device 100. The image 117 is being presented on the display 203 to the authorized user of the electronic device 100, i.e., person 102. As shown, the depictions 603,604,605 of persons 103,104,(105) have been blurred, while the depiction 602 of the authorized user is unblurred.

Person 102 then elects to share the image 117 to person 103. Accordingly, in one or more embodiments, a communication circuit (206) then transmits 606 the image 117 to a remote electronic device 607. In this illustration, the remote electronic device 607 belongs to person 103. In this illustration, the depictions 602,603,604,605 of four persons 102,103,104,(105) in the environment (101) of the electronic device 100 were blurred prior to presentation on the display 203 of the electronic device 100. However, as noted above, in other embodiments the authorized user will be able to see the depictions 602,603,604,605 of four persons 102, 103,104,(105) in the environment (101) of the electronic device 100, and the blurring will occur only upon transmitting 606 the one or more images 117 to the remote electronic device 607.

Since the remote electronic device 607 belongs to person 103, the depiction 603 of person 103 is unblurred when the image 117 is presented on the display of the remote electronic device 607. Person 103 is pleased with the image 117, enjoying the pleasant smile he had on his face when he was playing with Buster. Accordingly, he desires to share the image 117 with someone else. As shown in FIG. 6, person 103 retransmits 609 the image 117 to person 104.

When this occurs, the depiction 603 of person 103 is now unblurred. In one embodiment, this unblurring occurs when the communication circuit (206) of the electronic device 100 capturing the image 117 detects the retransmission 609 of the image 117 from the remote electronic device 607 to another remote electronic device 610, which in this example belongs to person 104. As shown at step 611, the depiction 603 of person 103 has been unblurred.

This process can repeat. If, for example, person 104 desires to share the image 117 with someone else, and retransmits the image 117 to yet another person, the communication circuit (206) of the electronic device 100 can detect this in one embodiment. Accordingly, when this occurs, the depiction 604 of person 104 will now be unblurred, and so forth.

Figure 4:
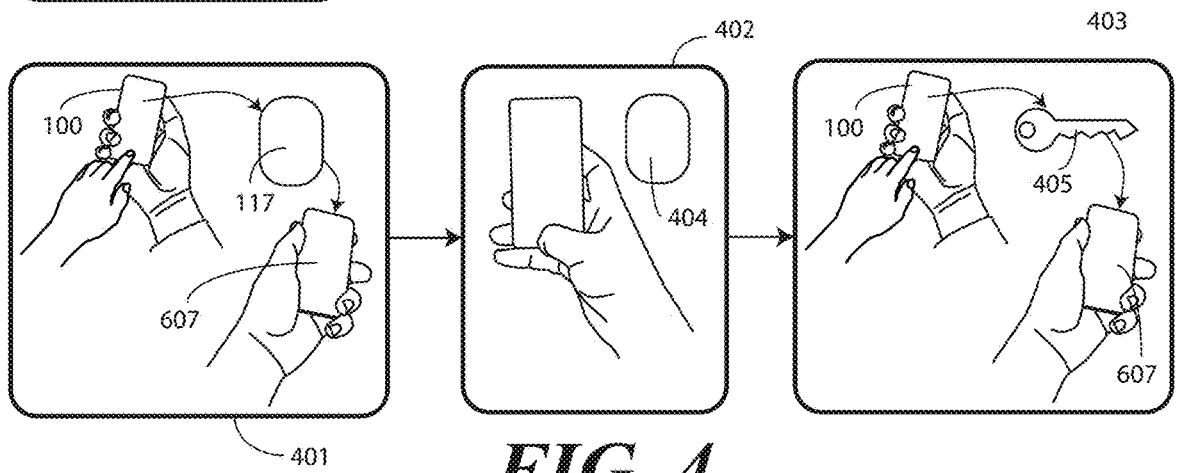
FIG. 4 illustrates one or more method steps in accordance with one or more embodiments of the disclosure.

Turning briefly to FIG. 4, illustrated therein is one way in which this can occur. At step 401, the electronic device 100 capturing the image 117 transmits the image 117 to a remote electronic device 607. At step 402, the remote electronic device 607 provides a reveal permission instruction 404, be it by the method of FIG. 6 described above, by one of the methods in FIGS. 7-9 described below, or by another method. In one or more embodiments, the communication circuit (206) of the electronic device 100 capturing the image 117 detects the receipt of the reveal permission instruction 404 occurring at step 402. Accordingly, at step 403 it transmits a key 405 to the remote electronic device 607, thereby allowing the depiction of person owning the remote electronic device 607 to be unblurred.

Figure 5:
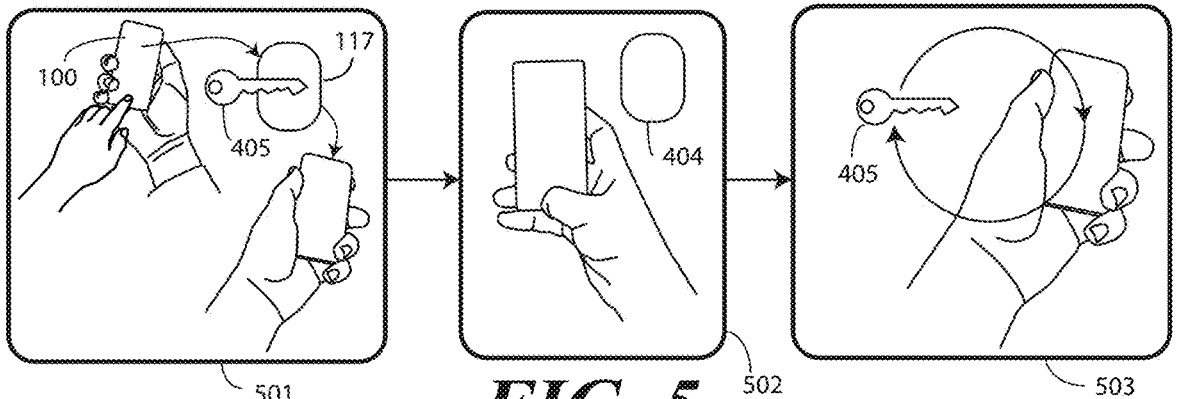
FIG. 5 illustrates one or more method steps in accordance with one or more embodiments of the disclosure.

In other embodiments, detection of the retransmission by the remote electronic device 607 by the communication circuit (206) of the electronic device 100 is not required. Turning now to FIG. 5, in this embodiment, once the electronic device 100 has transmitted the image 117, there is no additional communication between the receiving device, i.e., remote electronic device 607, and the electronic device 100 to unblur the depiction of person 103.

As shown in FIG. 5, at step 501 the electronic device 100 capturing the image 117 transmits the image 117 to a remote electronic device 607. Along with the image, the electronic device 100 transmits a key 405. The recipient does not initially have access to the key 405.

At step 502, the remote electronic device 607 provides a reveal permission instruction 404. At step 503, the provision of the reveal permission instruction 404 unlocks and allows the recipient access to the key 405, thereby allowing the depiction of person owning the remote electronic device 607 to be unblurred. It should be noted that the methods of FIGS. 4 and 5 are but two methods how images can be unblurred. Numerous others will be obvious to those of ordinary skill in the art having the benefit of this disclosure. For example, in another embodiment the key 405 can be stored in a cloud with which the remote electronic device 607 can communicate after providing the reveal permission instruction 505.

Turning now back to FIG. 6, in this embodiment as shown the electronic device 100 capturing the image 117 transmits 606 the image 117 to one or more remote electronic devices 607 belonging to persons 103 who are blurred in the captured image 117. If the electronic device 100 capturing the image 117 detects that one or more of the remote electronic devices 607 belonging to the persons 103 who are blurred in the captured image 117 then retransmit 609 the image 117 with other remote electronic devices 610, in one or more embodiments this "resharing" of the image 117 is interpreted by the electronic device 100 capturing the image 117 as receipt of a reveal permission instruction (404). Accordingly, the electronic device 100 capturing the image 117 then unblurs the sharing owner's depiction 603 in the image 117. The presumption is that the sharing owner would not retransmit the image 117 if they did not want their depiction 603 in that image to be unblurred. Accordingly, in one or more embodiments, sharing of the image by an electronic device 607 other than the electronic device 100 capturing the image 117 automatically grants a reveal permission instruction (404) to the electronic device 100 capturing the image. The electronic device 100 capturing the image 117 then acts to unblur the depiction 603 of the person 103 who is owner of the remote electronic device 607 sharing the image. In this example, the plurality of persons 102,103,104(105) appearing in the image 117 comprises an authorized user, i.e., person 103, of the remote electronic device 607, so the unblurring comprises unblurring a blurred image, i.e., depiction 603, of the authorized user appearing in the one or more images 117.

In one or more embodiments, when the other person 103 shares the image 117, the owner of the electronic device 100 capturing the image 117 is notified and/or is able to see the unblurred depiction 603 of the person 103 sharing the image 117. This can occur while depictions 604,605 of those who have not granted privacy are kept individually blurred. Advantageously, while the owner of the electronic device 100 capturing the image 117 is looking at the image 117, the depiction 603 of the other person 103 sharing the image 117 is seamlessly determined in the background. The depiction 603 of that person is then unblurred along with any other content belonging to that person 103 as well.

Figure 7:
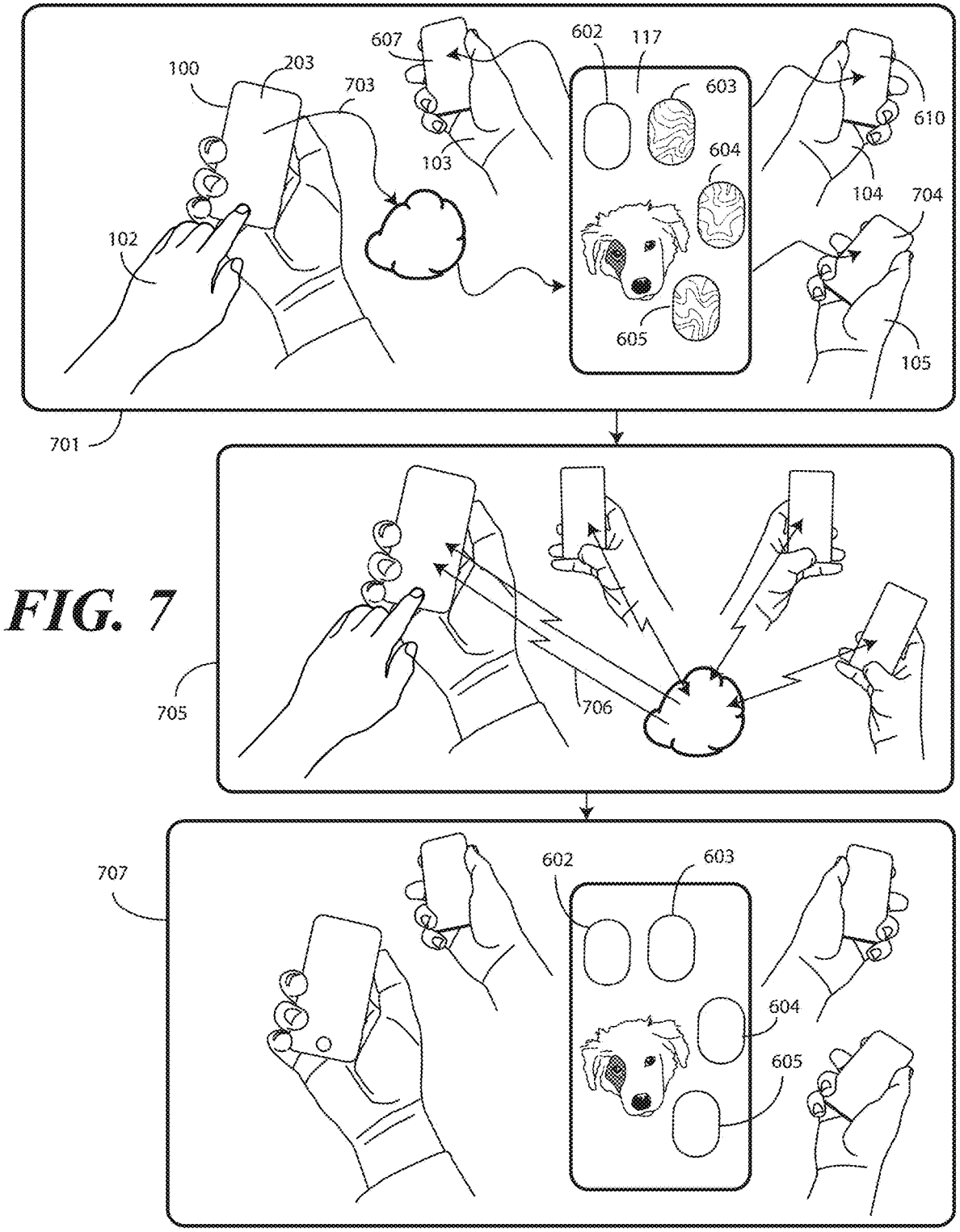
FIG. 7 illustrates one or more method steps in accordance with one or more embodiments of the disclosure.

Turning now to FIG. 7, illustrated therein is an alternate method for receiving the reveal permission instruction (404). As before, at step 701 person 102 has captured an image 117 that includes depictions 602,603,604,605 of four persons 102,103,104,(105) in an environment (101) of the electronic device 100. The image 117 is being presented on the display 203 to the authorized user of the electronic device 100, i.e., person 102. As shown, the depictions 603,604,605 of persons 103,104,105 have been blurred, while the depiction 602 of the authorized user is unblurred.

Person 102 then elects to share the image 117. However, rather than sharing with a single person, person 102 transmits 703 the image 117 to every other person 103,104,105 appearing in the image 117. Said differently, step 701 comprises person 102 transmitting 703, with a communication circuit (206) operable with the one or more processors (211) of the electronic device 100 capturing the image 117, the image to remote electronic devices 607,610,704 belonging to the plurality of persons 103,104,105 appearing in the image 117.

At step 705, each person 103,104,105 selects the "reply all" feature in response to receiving the image 117. As such, the communication circuit (206) of the electronic device 100 detects these reply all responses 706. The electronic device 100 then causes the unblurring of the blurred depictions 603,604,605 of those persons 103,104,105. As shown at step 707, the depictions 603,604,605 are now unblurred. The unblurring can occur using the method of FIG. 4, the method of FIG. 5, or another method obvious to those of ordinary skill in the art having the benefit of this disclosure.

Figure 8:
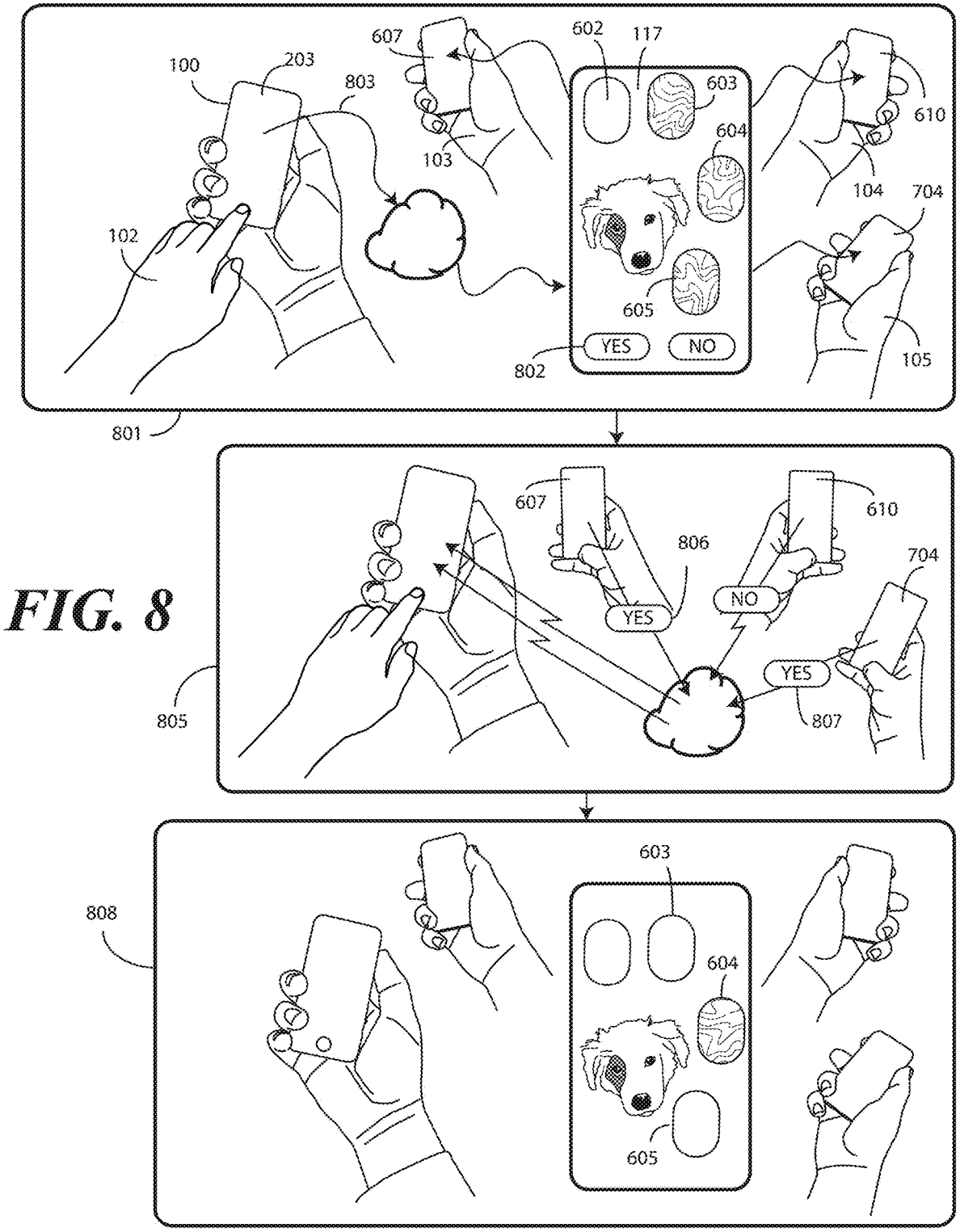
FIG. 8 illustrates one or more method steps in accordance with one or more embodiments of the disclosure.

In another embodiment, when the electronic device 100 capturing the image 117 shares the image 117 with a second person, a prompt requesting permission to unblur can be presented on the second device in conjunction with the image itself. Turning now to FIG. 8, illustrated therein is one method by which this can occur.

As before, at step 801 person 102 has captured an image 117 that includes depictions 602,603,604,605 of four persons 102,103,104,(105) in an environment (101) of the electronic device 100. The image 117 is being presented on the display 203 to the authorized user of the electronic device 100, i.e., person 102. As shown, the depictions 603,604,605 of persons 103,104,105 have been blurred, while the depiction 602 of the authorized user is unblurred.

Person 102 then elects to share the image 117. However, rather than sharing with a single person, person 102 transmits 803 the image 117 to every other person 103,104,105 appearing in the image 117. Said differently, step 801 comprises person 102 transmitting 803, with a communication circuit (206) operable with the one or more processors (211) of the electronic device 100 capturing the image 117, the image to remote electronic devices 607,610,704 belonging to the plurality of persons 103,104,105 appearing in the image 117.

In addition to transmitting the image 117, the communication circuit (206) also transmits a prompt 802 prompting the remote electronic devices 607,610,704 for the reveal permission instruction. At step 805, remote electronic devices 607,704 provide reveal permission instructions 806, 807, while remote electronic device 610 does not.

In one or more embodiments, the communication circuit (206) of the electronic device 100 detects the provide reveal permission instructions 806,807. The electronic device 100 then causes the unblurring of the blurred depictions 603,605 of those persons 103,105 providing the provide reveal permission instructions 806,807, while keeping the depiction 604 of person 104 blurred. As shown at step 808, the depictions 603,605 are now unblurred. The unblurring can occur using the method of FIG. 4, the method of FIG. 5, or another method obvious to those of ordinary skill in the art having the benefit of this disclosure.

Figure 9:
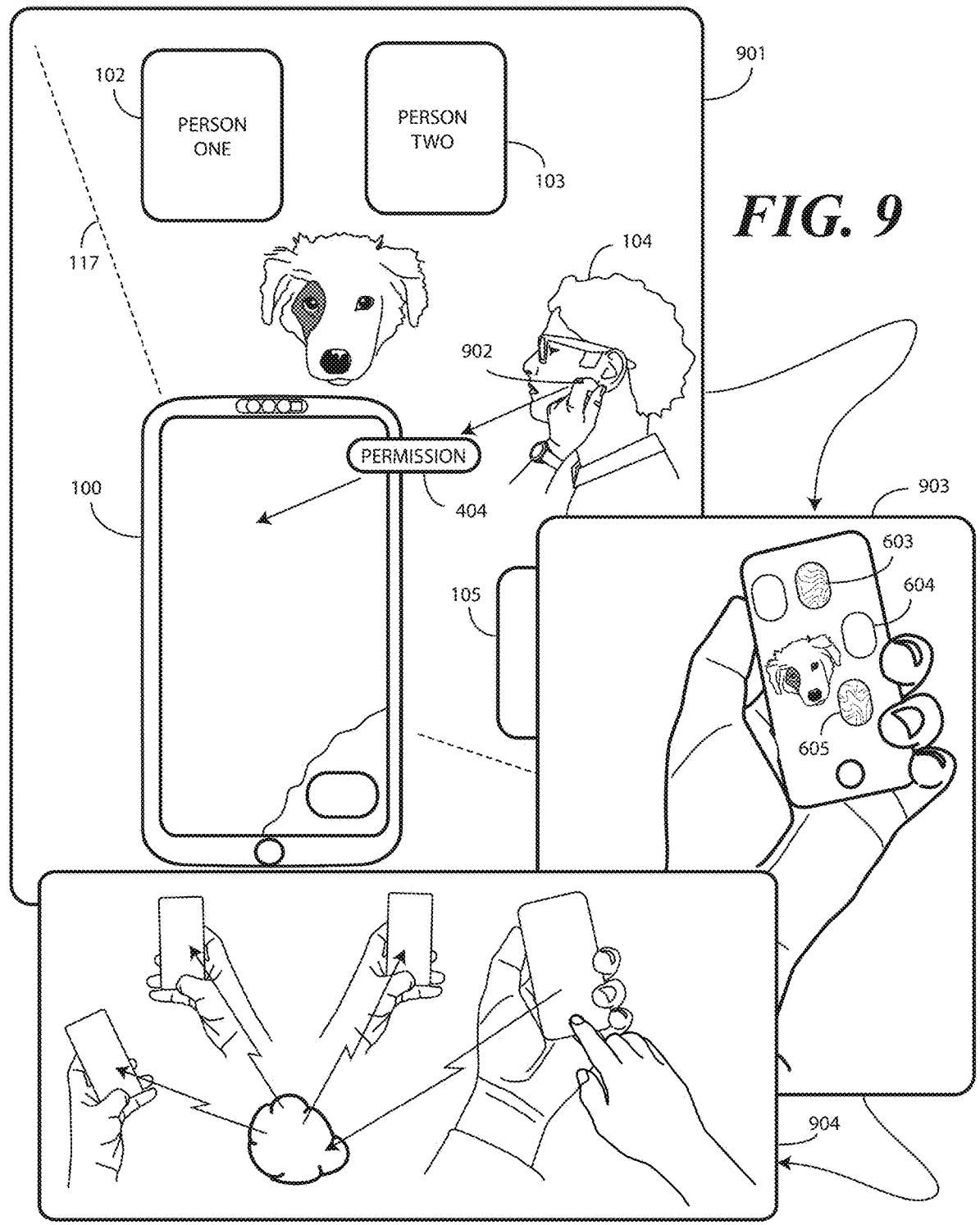
FIG. 9 illustrates one or more method steps in accordance with one or more embodiments of the disclosure.

Turning now to FIG. 9, illustrated therein is yet another method by which a reveal permission instruction 404 can be received by an electronic device 100 capturing an image 117 of one or more persons 102,103,104,105.

At step 901, person 104 is expressing a predefined mien 902. In one or more embodiments, a person 104 can provide a reveal permission instruction 404 the electronic device 100 by providing a predefined mien 902 in the image 117 for the face analyzer (219) to detect. As used herein, "mien" takes the ordinary English definition of a person's look or manner, especially one of a particular kind indicating their character or mood. As used with embodiments of the disclosure, a mien is an intentional facial or bodily pose or position in which the user places their face or body to deliver a reveal permission instruction 404 to the electronic device 100.

Illustrating by example, rather than staring blankly at the electronic device 100 during capture of the image 117, in one or more embodiments person 104—or another person— can adopt a particular mien 902 intentionally as a secret way to grant the reveal permission instruction 404. Examples of miens include one of one or more raised eyebrows, one or more closed eyes, one or more fingers touching a face, forcing the mouth open, closing the mouth with a smile or frown, making an intentionally happy face, making an intentionally sad face, pulling the hair, or orienting the face in a particular direction, such as a profile view. Other examples of miens include looking up or looking down or standing in front of a structure, a door, a car, in bright light, and so forth. Other examples of miens will be obvious to those of ordinary skill in the art having the benefit of this disclosure. In the illustrative embodiment of FIG. 9, person 104 is expressing a mien by touching their cheek.

Accordingly, when the image 117 is presented at step 903, the depictions 603,605 of persons 103,105 have been blurred, while the depictions 602,604 of the authorized user and the person 104 expressing the mien 902 are unblurred. Should the image be transmitted at step 904, the unblurring methods for depictions 602,604 described above can then occur.

Figure 10:
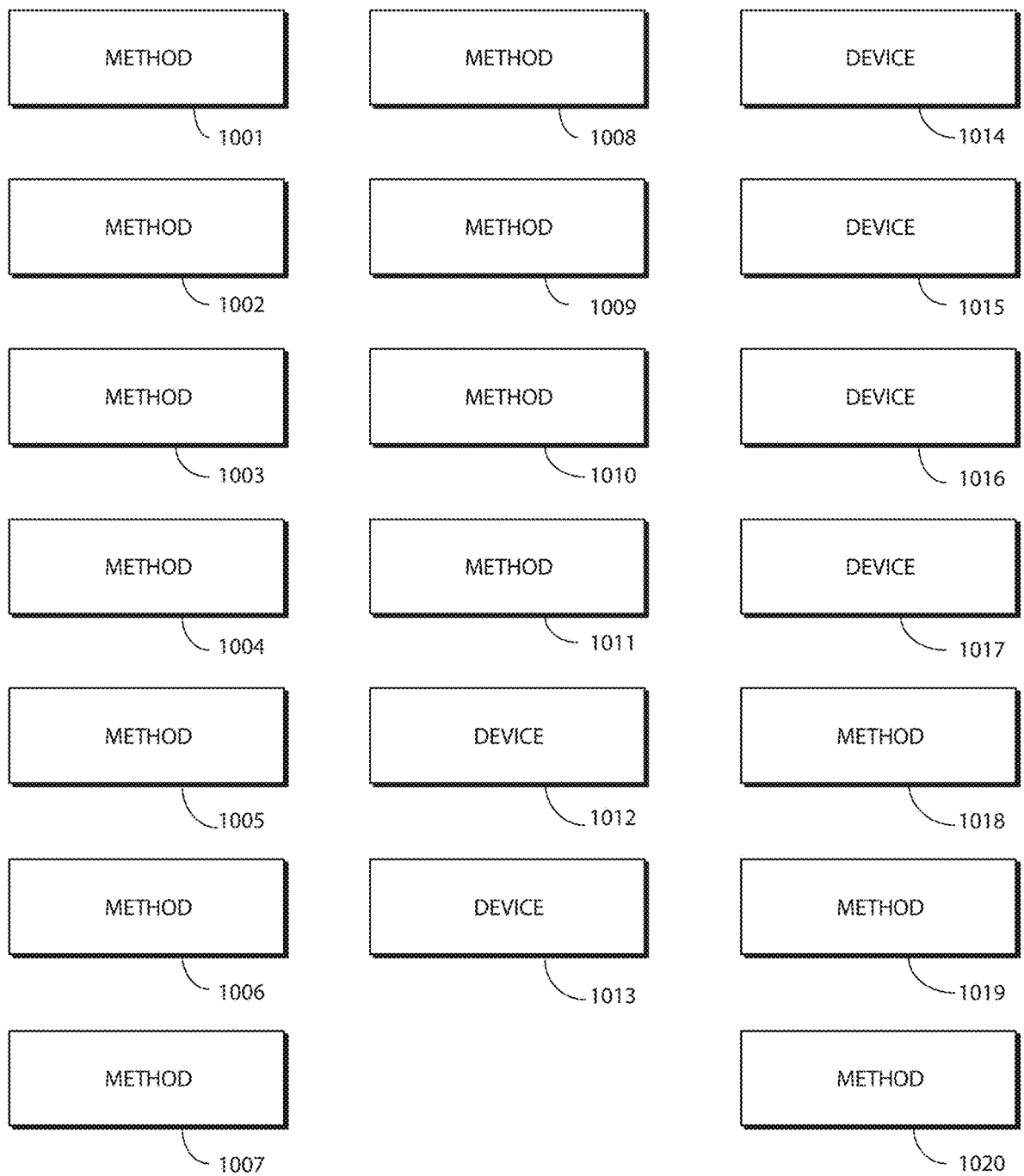
FIG. 10 illustrates one or more embodiments of the disclosure.

Turning now to FIG. 10, illustrated therein are various embodiments of the disclosure. At 1001, a method comprises capturing, with an imager of an electronic device, one or more images of a plurality of persons within an environment of the electronic device. At 1001, the method comprises blurring, with one or more processors operable with the imager, at least a face of at least one person of the plurality of persons appearing in the one or more images. At 1001, the method comprises receiving, with the one or more processors, permission from the at least one person to reveal the at least a face of the at least one person in the one or more images. At 1001, the method comprises revealing, by the one or more processors, the at least a face of the at least one person in the one or more images by causing an unblurring of at least a face of the at least one person in the one or more images.

At 1002, the method of 1001 further comprises identifying, with one or more sensors, an authorized user and at least one unauthorized user of the electronic device in the plurality of persons. At 1002, the at least one person of 1001 comprises the at least one unauthorized user of the electronic device. At 1003, the method of 1002 further comprises precluding blurring of the authorized user in the one or more images.

At 1004, the method of 1001 further comprises identifying, with one or more sensors, one or more persons from the plurality of persons. At 1004, the method of 1001 further comprises presenting, on a user interface with the one or more processors, an identification of the one or more persons.

At 1005, the method of 1001 further comprises transmitting, with a communication circuit operable with the one or more processors, the one or more images to a remote electronic device. At 1006, the blurring of 1005 occurs only upon transmitting the one or more images to the remote electronic device.

At 1007, the method of 1005 further comprises detecting, with the communication circuit, a retransmission of the one or more images from the remote electronic device. At 1008, the plurality of persons of 1007 comprises an authorized user of the remote electronic device. At 1008, the method of 1007 further comprises unblurring a blurred image of the authorized user appearing in the one or more images.

At 1009, the method of 1001 further comprises transmitting, with a communication circuit operable with the one or more processors, the one or more images to remote electronic devices belonging to the plurality of persons. At 1010, the method of 1009 further comprises detecting, with the communication circuit, a response to the electronic device and each electronic device of the remote electronic devices. At 1010, the method of 1009 further comprises unblurring a blurred image of an authorized user of the electronic device transmitting the response in the one or more images.

At 1011, the one or more images of 1001 each comprise a digital negative and a corresponding photographic rendering. At 1011, the method of 1001 further comprises precluding, with the one or more processors, access to the digital negative in the electronic device until permission is received from each person of the plurality of persons.

At 1012, an electronic device comprises an imager and one or more processors operable with the imager. At 1012, the imager captures at least one image of a plurality of persons. At 1012, the one or more processors blur depictions of one or more persons of the plurality of persons until a reveal permission instruction is detected.

At 1013, the one or more processors of 1012 unblur the depictions of persons from which the reveal permission instruction is received after the reveal permission instruction is received. At 1014, the electronic device of 1013 further comprises a communication circuit operable with the one or more processors. At 1014, the communication circuit transmits the at least one image to at least one remote electronic device. At 1015, the reveal permission instruction of 1014 comprises retransmission, by the at least one remote electronic device, of the at least one image.

At 1016, the electronic device of 1013 further comprises a communication circuit operable with the one or more processors. At 1016, the communication circuit transmits the at least one image to at least one remote electronic device and prompts the at least one remote electronic device for the reveal permission instruction.

At 1017, the electronic device of 1012 further comprises a memory. At 1017, the at least one image of 1012 comprises a digital negative and a corresponding photographic rendering. At 1017, the one or more processors of 1012 store the digital negative in the memory unblurred. At 1017, the blurring of 1012 occurs in the corresponding photographic rendering.

At 1018, a method comprises detecting, with one or more processors of an electronic device, depictions of a plurality of persons in one or more images. At 1018, the method comprises blurring, with the one or more processors, at least some depictions of at least some persons of the plurality of persons in the one or more images while leaving at least one depiction of at least one person of the plurality of persons unblurred. At 1018, the method comprises detecting, with a communication circuit operable with the one or more processors, permission to unblur a depiction of a permitting person of the plurality of persons in the one or more images. At 1018, the method comprises causing, by the one or more processors, unblurring of the depiction of the permitting person of the plurality of persons in the one or more images.

At 1019, the method of 1018 further comprises identifying, with one or more sensors, an authorized user of the electronic device. At 1019, the at least one person of 1018 comprises the authorized user of the electronic device. At 1020, the method of 1018 further comprises prompting, with the communication circuit, remote electronic devices for the permission.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
   capturing, with an imager of an electronic device, one or more images of a plurality of persons within an environment of the electronic device;
   blurring, with one or more processors operable with the imager, at least a face of at least one person of the plurality of persons appearing in the one or more images;
   transmitting, with a communication circuit operable with the one or more processors, the one or more images to a remote electronic device;
   automatically receiving, with the one or more processors, permission from the at least one person to reveal the at least a face of the at least one person in the one or more images by detecting, with the communication circuit, a retransmission of the one or more images from the remote electronic device; and
   revealing, by the one or more processors, the at least a face of the at least one person in the one or more images by causing an unblurring the at least a face of the at least one person in the one or more images after automatically receiving the permission.

2. The method of claim 1, further comprising:
   identifying, with one or more sensors, an authorized user and at least one unauthorized user of the electronic device in the plurality of persons;
   wherein the at least one person comprises the at least one unauthorized user of the electronic device.

3. The method of claim 2, further comprising precluding blurring of the authorized user in the one or more images.

4. The method of claim 1, further comprising:
   identifying, with one or more sensors, one or more persons from the plurality of persons; and
   presenting, on a user interface with the one or more processors, an identification of the one or more persons.

5. The method of claim 1, further comprising detecting, with the communication circuit, authentication of the at least one person by the remote electronic device, wherein the unblurring occurs only after the at least one person is authenticated by the remote electronic device.

6. The method of claim 1, wherein the blurring occurs only upon transmitting the one or more images to the remote electronic device.

7. The method of claim 1, the plurality of persons comprising an authorized user of the electronic device, wherein the blurring of the at least a face of the at least one person of the plurality of persons appearing in the one or more images leaves depictions of the authorized user unblurred.

8. The method of claim 1, wherein the plurality of persons comprises an authorized user of the remote electronic device, further comprising unblurring a blurred image of the authorized user appearing in the one or more images.

9. The method of claim 1, further comprising transmitting, with the communication circuit operable with the one or more processors, the one or more images to remote electronic devices belonging to the plurality of persons.

10. The method of claim 9, further comprising:
    detecting, with the communication circuit, a response to:
       the electronic device; and
       each electronic device of the remote electronic devices; and
    unblurring a blurred image of an authorized user of the electronic device transmitting the response in the one or more images.

11. The method of claim 1, wherein the one or more images each comprise a digital negative and a corresponding photographic rendering, further comprising precluding, with the one or more processors, access to the digital negative in the electronic device until permission is received from each person of the plurality of persons.

12. An electronic device, comprising:
    an imager;
    one or more processors operable with the imager;
    the imager capturing at least one image of a plurality of persons;
    the one or more processors blurring depictions of one or more persons of the plurality of persons until a reveal permission instruction is detected;
    the reveal permission instruction comprising retransmission, by at least one remote electronic device, of the at least one image to another electronic device;

the one or more processors revealing a depiction of at least one person of the plurality of persons upon detecting the reveal permission instruction.

13. The electronic device of claim 12, the one or more processors unblurring the depictions of persons from which the reveal permission instruction is received after the reveal permission instruction is received.

14. The electronic device of claim 13, further comprising a communication circuit operable with the one or more processors, the communication circuit transmitting the at least one image to the at least one remote electronic device.

15. The electronic device of claim 12, further comprising delivering an unblurring tool to the at least one remote electronic device in response to detecting the reveal permission instruction.

16. The electronic device of claim 13, further comprising a communication circuit operable with the one or more processors, the communication circuit transmitting the at least one image to the at least one remote electronic device and prompting the at least one remote electronic device for the reveal permission instruction.

17. The electronic device of claim 12, further comprising a memory, wherein the at least one image comprises a digital negative and a corresponding photographic rendering, the one or more processors storing the digital negative in the memory unblurred, wherein the blurring occurs in the corresponding photographic rendering.

18. A method, comprising:
detecting, with one or more processors of an electronic device, depictions of a plurality of persons in one or more images;
blurring, with the one or more processors, at least some depictions of at least some persons of the plurality of persons in the one or more images while leaving at least one depiction of at least one person of the plurality of persons unblurred;
passively detecting, with a communication circuit of the electronic device operable with the one or more processors, permission to unblur a depiction of a permitting person of the plurality of persons in the one or more images by a remote electronic device retransmitting the one or more images; and
causing, by the one or more processors, unblurring of the depiction of the permitting person of the plurality of persons in the one or more images.

19. The method of claim 18, further comprising identifying, with one or more sensors, an authorized user of the electronic device, wherein the at least one person comprises the authorized user of the electronic device.

20. The method of claim 18, further comprising prompting, with the communication circuit, remote electronic devices for the permission.

* * * * *